(12) United States Patent
Tanaka

(10) Patent No.: US 8,611,669 B2
(45) Date of Patent: Dec. 17, 2013

(54) IMAGE PROCESSING APPARATUS, IMAGE PROCESSING METHOD AND COMPUTER-READABLE MEDIUM

(75) Inventor: Eiichi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 307 days.

(21) Appl. No.: 13/091,839

(22) Filed: Apr. 21, 2011

(65) Prior Publication Data

US 2012/0141035 A1   Jun. 7, 2012

(30) Foreign Application Priority Data

Dec. 6, 2010   (JP) ................................ 2010-271536

(51) Int. Cl.
*G06K 9/46*   (2006.01)
(52) U.S. Cl.
USPC ........... 382/202; 382/179; 382/150; 382/177; 382/190; 382/276
(58) Field of Classification Search
USPC ......... 382/202, 179, 150, 177, 190, 276, 186, 382/229
See application file for complete search history.

(56) References Cited

U.S. PATENT DOCUMENTS

2007/0140565 A1*   6/2007   Lin et al. ........................ 382/203
2009/0245654 A1*   10/2009   Xing et al. ..................... 382/203

FOREIGN PATENT DOCUMENTS

JP   A-08-016782   1/1996
JP   A-10-049688   2/1998

OTHER PUBLICATIONS

Lemaitre et al., "Text Line Extraction in Handwritten Document with Kalman Filter Applied on Low Resolution Image," *Proceedings of the Second International Conference on Document Image Analysis for Libraries*, 2006, DIAL '06, IEEE.

* cited by examiner

*Primary Examiner* — Ruiping Li
(74) *Attorney, Agent, or Firm* — Oliff & Berridge, PLC

(57) ABSTRACT

An image processing apparatus includes a line information reception unit, a line extraction unit, an inversion unit and a determination unit. The line information reception unit receives a set of information indicating (i) information on an image having a possibly of being a line and (ii) line elements being a rectangular pixel lump which constitutes a line. The line extraction unit extracts a line by tracing from a first start point to an end point of the line, based on the received information indicating the line elements and a tracing direction of the line. The inversion unit inverts the tracing direction of the line, sets the extracted end point of the line as a second start point and sends the second start point and the inverted tracing direction to the line extraction unit. The determination unit determines whether or not to cause the inversion unit to perform a process.

8 Claims, 21 Drawing Sheets

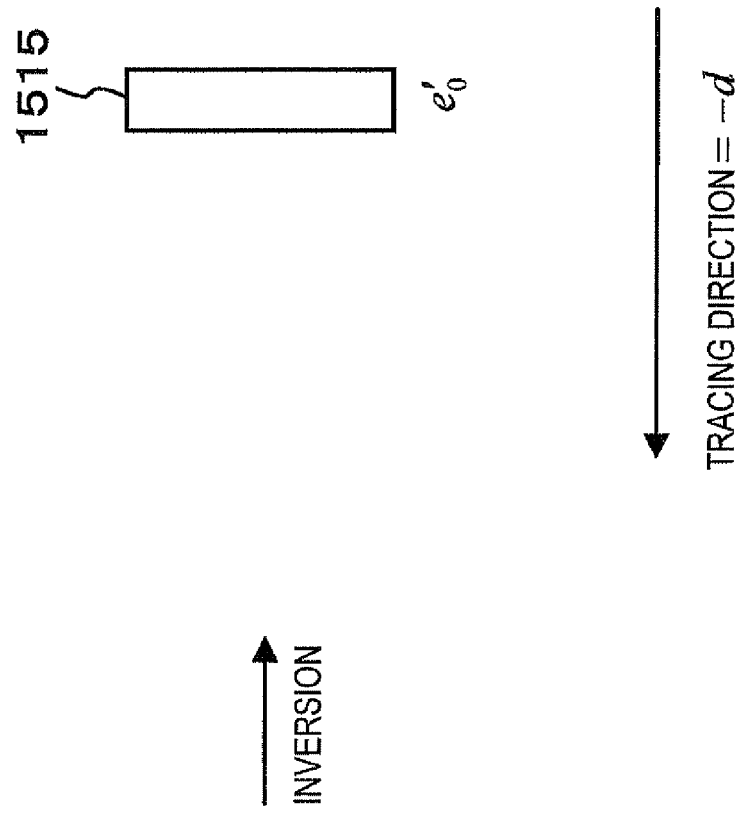
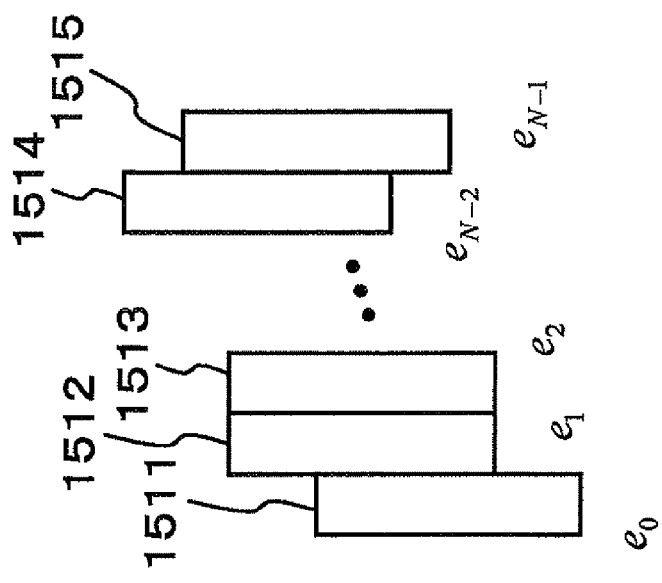

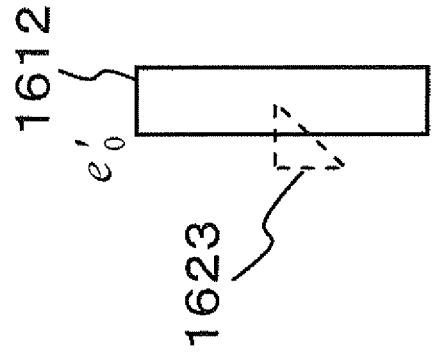
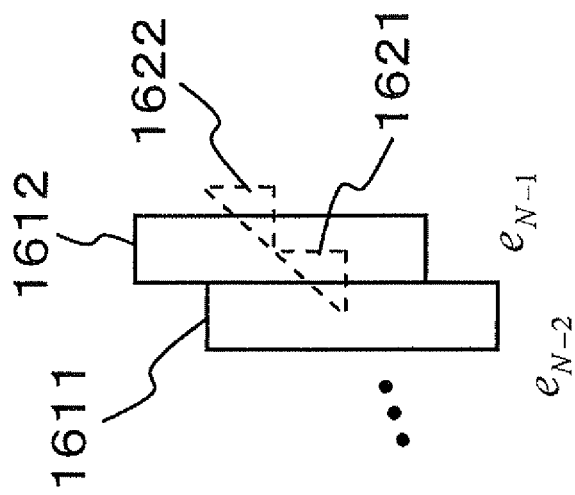
FIG. 16B
FIG. 16A

IMAGE PROCESSING APPARATUS, IMAGE PROCESSING METHOD AND COMPUTER-READABLE MEDIUM

CROSS-REFERENCE TO RELATED APPLICATION

This application is based on and claims priority under 35 USC119 from Japanese Patent Application No. 2010-271536 filed on Dec. 6, 2010.

BACKGROUND

1. Technical Field

The present invention relates to an image processing apparatus, an image processing method and a computer-readable medium.

2. Related Art

Techniques for extracting line segments from an image are known in the art.

SUMMARY

According to an aspect of the invention, an image processing apparatus includes a line information reception unit, a line extraction unit, an inversion unit and a determination unit. The line information reception unit receives a set of information indicating (i) information on an image having a possibly of being a line and (ii) line elements being a rectangular pixel lump which constitutes a line. The line extraction unit extracts a line by tracing from a first start point to an end point of the line, based on the information indicating the line elements received by the line information reception unit and a tracing direction of the line. The inversion unit inverts the tracing direction of the line, sets the end point of the line extracted by the line extraction unit as a second start point, and sends the second start point and the inverted tracing direction to the line extraction unit. The determination unit determines whether or not to cause the inversion unit to perform a process.

BRIEF DESCRIPTION OF THE DRAWINGS

Exemplary embodiment of the invention will be described in detail based on the following figures, wherein:

FIG. 3 is an explanatory view illustrating an example image read from a scanner or the like;

FIGS. 15A and 15B are explanatory views illustrating an example inversion processing;

FIGS. 16A and 16B are explanatory views illustrating an example inversion processing;

FIGS. 17A and 1713 are explanatory views illustrating an example inversion processing;

DETAILED DESCRIPTION

Hereinafter, various exemplary embodiments suitable for realizing the invention will be described with reference to the drawings.

Figure 1:
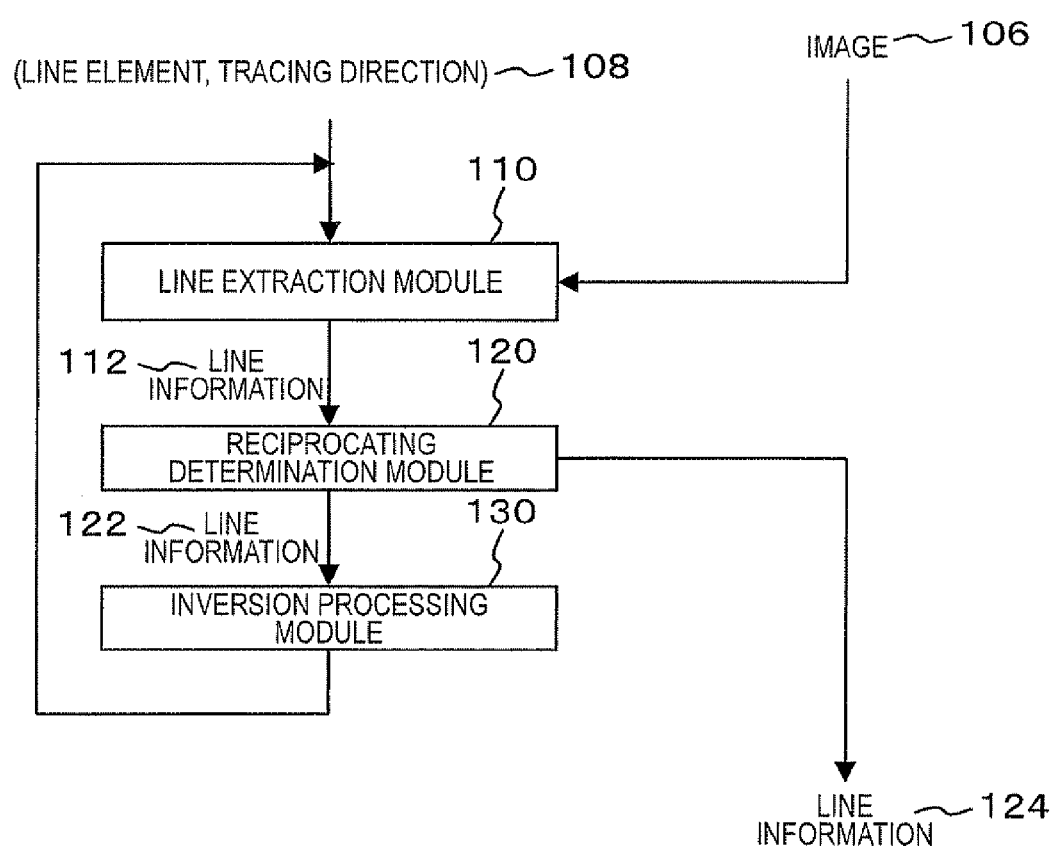
FIG. 1 is a conceptual module configuration view of an example configuration according to a first embodiment.

FIG. 1 is a conceptual module configuration view of an example configuration according to a first embodiment.

A "module" used herein refers generally to a part such as logically separatable software (computer program), hardware, and so on. Accordingly, a module in this embodiment includes not only a module in a computer program but also a module in hardware configuration. Thus, this embodiment describes all computer programs (including a program which causes a computer to execute steps, a program which causes a computer to function as means, and a program which causes a computer to realize functions) that cause this embodiment to function as modules, the system, and method. For the purpose of convenience of description, as used herein, "store," "be stored" or the equivalents thereof mean that a computer program is stored in a storage device or is controlled to be stored in a storage device when the embodiment is related to the computer programs. Although the module is in one-to-one correspondence with a function, when it comes to mounting, one module may be configured as one program, a plurality of modules may be configured as one program, or one module may be configured as a plurality of programs. A plurality of modules may be executed by one computer, or one module may be executed by a plurality of computers in distributed or parallel environments. One module may contain other modules. As used herein, the term "connection" includes logical connections (data delivery, instruction, reference relation between data, and so on) in addition to physical connections. As used herein, the term "system" or "apparatus" includes one computer, hardware, apparatus, and the like in addition to a plurality of computers, hardware, apparatuses, and the like interconnected via a communication means such as a network (including one-to-one correspondence communication connection). In the specification, "apparatus" is synonymous with "system." Of course, the "system" does not include anything that is merely a social "structure" (social system) that is an artificial decision. As used herein, the term "predetermined" means determination before an object process, including not only determination before the start of processing by the embodiment but also determination according to situations and condition at that time or situations and condition up to that time when this determination is determination before an object process even after the start of processing by the embodiment. When different modules perform different processes or one module performs different processes, information intended for processing is read from a storage unit and a result of the processing is written in the storage unit. Thus, explanation regarding reading information out of the storage unit before processing and writing information in the storage unit after processing may be omitted. A storage unit used herein may include a hard disk, a random access memory (RAM), an external storage medium, a storage unit via a communication line, a register within a central processing unit (CPU), and so on.

An image processing apparatus of the first embodiment extracts a line pattern (image) from a target image and includes a line extraction module 110, a reciprocating determination module 120, and an inversion processing module 130, as shown in the example of FIG. 1.

First, a target image 106 in the first embodiment will be described.

Figure 2:
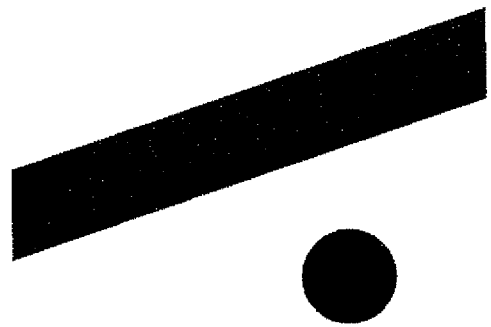
FIG. 2 is an explanatory view illustrating an example target image.

FIG. 2 is an explanatory view illustrating an example target image. The illustrated image includes a line image (pattern) and a non-line image.

Figure 3:
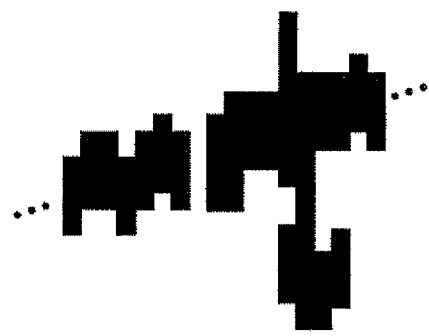

FIG. 3 is an explanatory view illustrating an example image (pixel data) obtained when a scanner or the like reads the images illustrated in FIG. 2. In this example, a line to be extracted may not be necessarily represented as a single region, which may be regarded as a straight line, in a target image due to an effect of noise, dotted lines, dashed lines, non-line patterns, and the like read by the scanner or the like. More specifically, there may occur crushed or deficient lines and the like.

Figure 4:
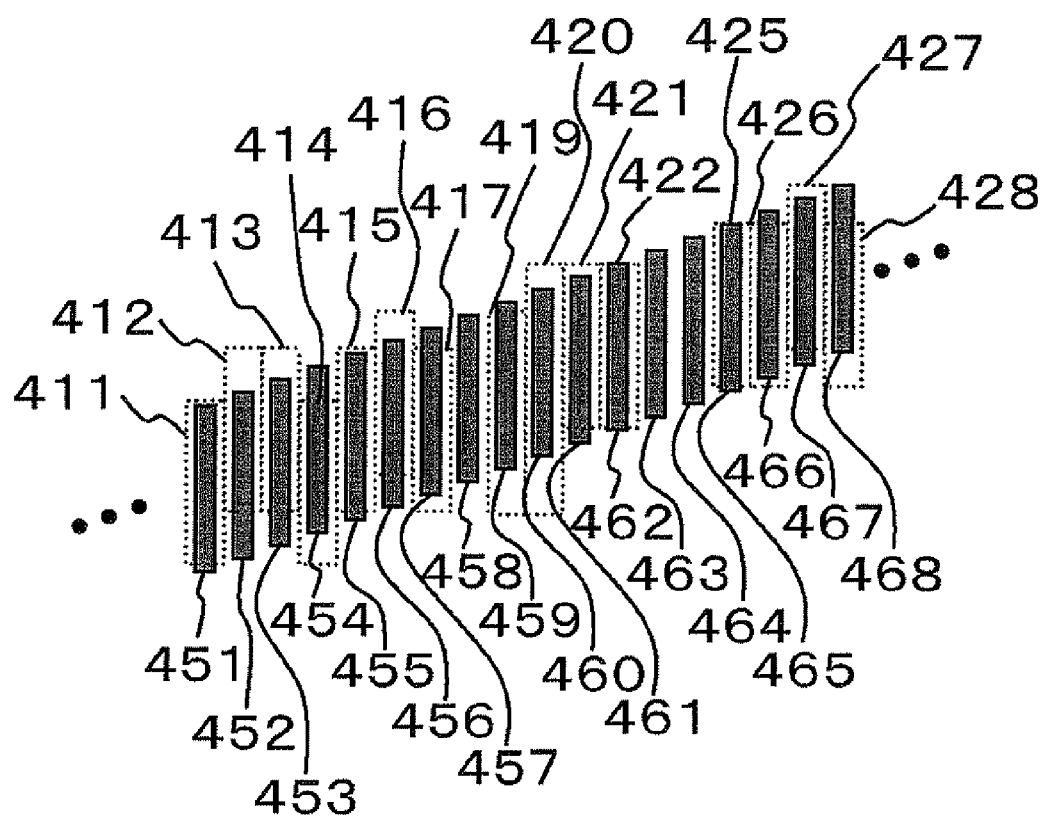
FIG. 4 is an explanatory view illustrating an example of line extraction.

FIG. 4 is an explanatory view illustrating an example of line extraction.

In this example, a line is identified as a set of regions corresponding to pixel runs extending in a direction intersecting (for example, perpendicular to) a line direction. Hereinafter, these regions are called "line elements."

The first embodiment involves detecting and integrating pixel runs corresponding to lines to be extracted (that is, observed line elements), as shown in the example of FIG. 4. A result of integration of pixel runs corresponds to a line image.

In addition, real line elements (that is, corrected line elements) may be generated based on these pixel runs. For example, in FIG. 4, observation line elements 411 to 428 indicated by dotted lines correspond to line elements observed within an image and correction line elements 451 to 468 indicated by gray rectangles correspond to line elements corrected based on the observation line element 411 and the like. For example, while the observation line element 411 is equal to the correction line element 451, the observation line element 412 moves downward to correspond to the correction line element 452 and the observation line element 414 moves upward to correspond to the correction line element 454. In addition, while there is no line element observed between the observation line element 422 and the observation line element 425, the correction line element 463 and the correction line element 464 are added.

An image 106 is an image to be extracted as a line which may include noises such as bending, cracks (including dotted lines and dashed lines), distortions, line intersections, and the like. Positions of such a bending and cracks are not necessarily already known.

FIGS. 5A, 5B, 5C and 5D are explanatory views illustrating an example of extracting a line from a noisy line image. As shown in an example of FIG. 5A, a line includes an intersection.

Figure 5A:
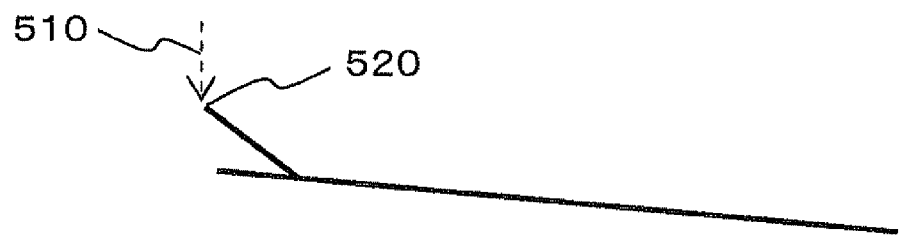
FIGS. 5A, 5B, 5C and 5D are explanatory views illustrating an example of extracting a line from a noisy line image.
Figure 5B:
Figure 5C:
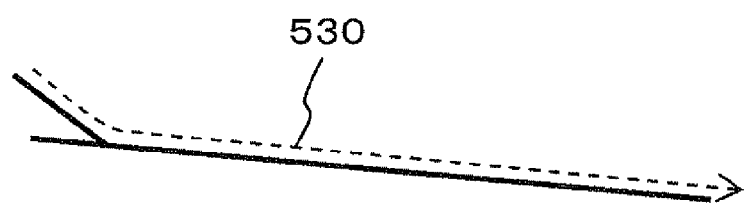
Figure 5D:

Now, consider that a line shown in an example of FIG. 5B is extracted, as a target image 106, from the line shown in the example of FIG. 5A.

If the line is extracted from the line shown in the example of FIG. 5A using the methods described in the above JP-A-10-049688, JP-A-08-016782 and A. Lemaitre, J. Camillerapp, "Text Line Extraction in Handwritten Document with Kalman Filter Applied on Low Resolution Image," Proceedings of the Second International Conference on Document Image Analysis for Libraries (DIAL'06), 2006, and if the first black pixel of start point retrieval scan 510 is assumed as a start line element 520, a start point of line extraction would be mistakenly specified. In addition, as shown in an example of FIG. 5C, since the line is extracted through line tracing performed in a line extraction direction 530, the line is mistakenly extracted as shown in an example of FIG. 5D.

Hereinafter, a process of this embodiment will be outlined as follows.

Figure 6A:
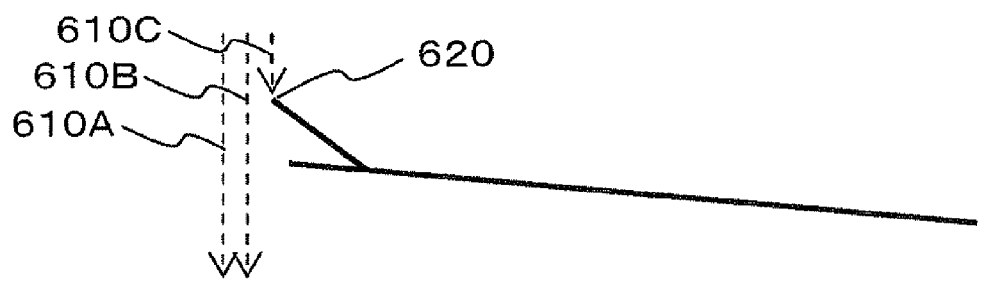
FIGS. 6A, 6B, 6C and 6D are explanatory views illustrating an example of reciprocating processing.
Figure 6B:
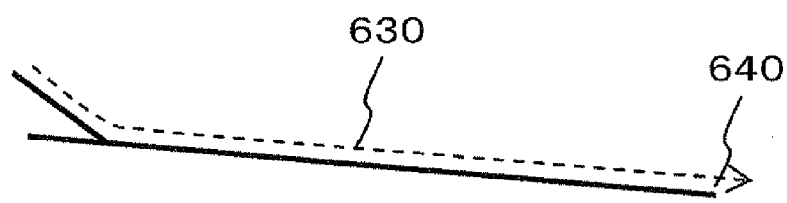
Figure 6C:
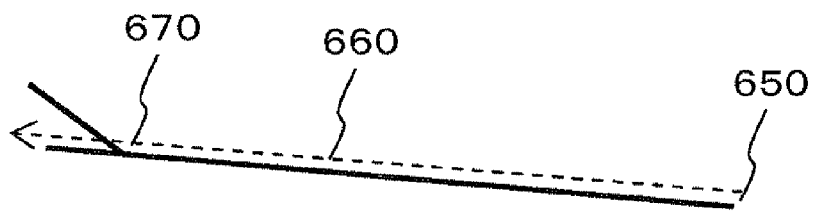
Figure 6D:

FIGS. 6A, 6B, 6C and 6D are explanatory views illustrating an example of a reciprocating processing of this embodiment. A line shown in an example of FIG. 6A has an intersection, similarly to the line shown in the example of FIG. 5A. A start point of line tracing is retrieved in order of start point retrieval scan 610A, 610B, and 610C and a black pixel which is first found is assumed as a start point. This is the same as the above-described method. That is, this means line tracing from an incorrect start point (start point element 620). Accordingly, as shown in an example of FIG. 6B, since line tracing is carried out in a line extraction direction 630, incorrect line extraction is performed for a time. Here, an end point (end line element 640) of the extracted line in FIG. 6B is again line-extracted as a start point. That is, a reciprocating process is performed. More specifically, the end line element 640 shown in the example of FIG. 6B is assumed as a start line element 650 shown in an example of FIG. 6C and line tracing is performed therefrom in a line extraction direction 660. In addition, in the line tracing processing, if an intersection occurs, a line in the line extraction direction is selected and traced based on a direction of the line traced until then. Thus, as shown in the example of FIG. 6C, an error at a branch point 670 is corrected by progress of tracing in a straighter direction due to this second line extraction. Accordingly, the correct line extraction results in the same correct line extraction as shown in an example of FIG. 6D.

FIGS. 7A, 7B, 7C and 7D are explanatory views illustrating an example of a reciprocating processing.

Figure 7A:
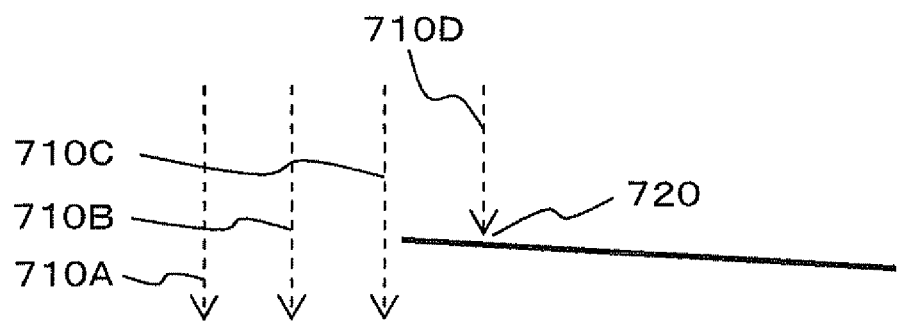
FIGS. 7A, 7B, 7C and 7D are explanatory views illustrating an example reciprocating processing.
Figure 7B:
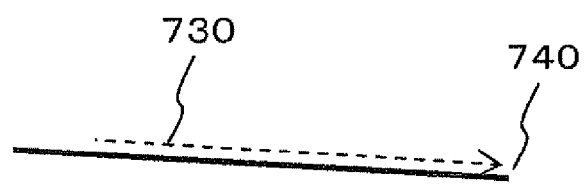
Figure 7C:
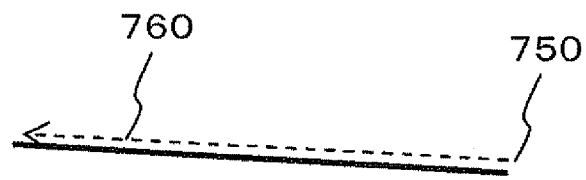
Figure 7D:

A line extraction start point retrieval is different from that shown in the example of FIG. 6. That is, as shown in an example of FIG. 7A, since start point retrieval scanning 710A, 710B, 710C, and 710D have wide intervals therebetween (that is, scanning is coarse; specifically, a scanning interval is predetermined value), a line extraction start point becomes a start line element 720 and is not a line end point. Since line tracing is performed from this start point in a line extraction direction 730, incorrect line extraction is performed for a time as shown in an example of FIG. 7B. Here, a reciprocating processing is performed. More specifically, an end line element 740 shown in the example of FIG. 7B is assumed as a start line element 750 shown in an example of FIG. 7C and line tracing is performed therefrom in a line extraction direction 760. Accordingly, the correct line extraction results in the same correct line extraction as shown in an example of FIG. 7D. That is, as shown in the example of FIG.

7A, the line extraction is performed even if the precision of the line extraction start point retrieval is low. In addition, to accelerate the entire process, this process (with equal to or more than a predetermined start point retrieval interval) may be performed. This is because line extraction start point retrieval is accelerated. In addition, since a line extraction distance is lengthened (that is, the number of line elements increases), straightness increases with the progress of tracing and is used to perform line extraction corresponding to the same intersection as described above.

FIGS. 8A, 8B, 8C, 8D and 8E are explanatory views illustrating an example of a reciprocating processing according to this embodiment.

Figure 8A:
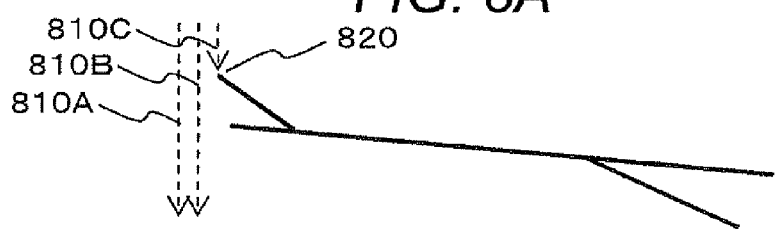
FIGS. 8A, 8B, 8C, 8D and 8E are explanatory views illustrating an example reciprocating processing.
Figure 8B:
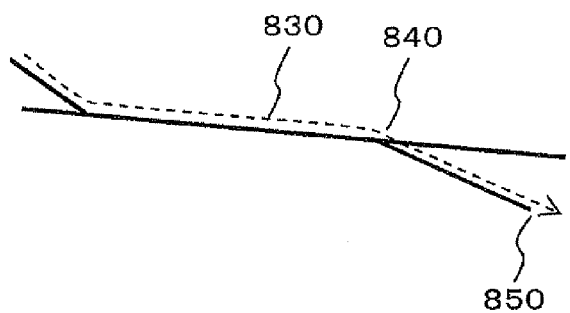
Figure 8C:
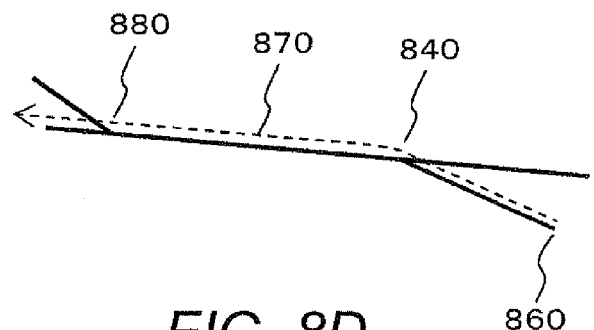
Figure 8D:
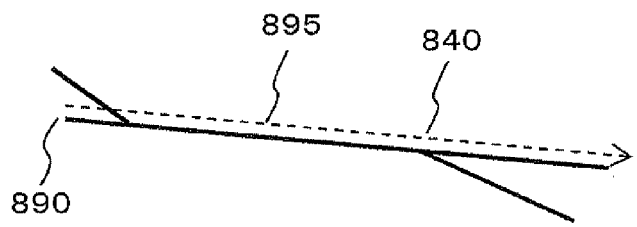
Figure 8E:
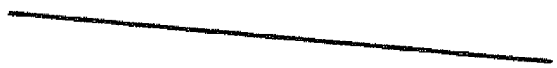

A line shown in an example of FIG. 8A has two intersections and a crack. As shown in the example of FIG. 8A, line extraction is performed from a start point (start line element 820) which is incorrect in start point retrieval scan 810A, 810B, and 810C and start point retrieval. In this case, the start point is incorrect and line tracing is performed in a line extraction direction 830 as shown in an example of FIG. 8B. In addition, at a cracked branch point (crack) 840, line extraction is progressed in an incorrect direction to trace up to an end line element 850. This is an error occurring since straightness of line extraction at this point of time is not sufficient to drive a crack of a branch point (crack) 840 straight. Here, a reciprocating process is performed. More specifically, the end line element 850 shown in the example of FIG. 8B is assumed as a start line element 860 shown in an example of FIG. 8C and line tracing is performed therefrom in a line extraction direction 870. Thus, as shown in the example of FIG. 8C, an error at a branch point 880 is corrected by progress of tracing in a straighter direction. However, since an error of the branch point (crack) 840 is left, incorrect line extraction is performed. Here, as shown in an example of FIG. 8D, a reciprocating process is performed in a line extraction direction 895. Thus, if straightness of line extraction at this point of time is sufficient to drive a crack of the branch point (crack) 840 straight (that is, as shown in the example of FIG. 8C, if straightness increases by an amount corresponding to a range from the branch point 880 to a start line element 890 by reaching the start line element 890 advancing from the branch point 880 in a straight direction and a value of the straightness is equal to or more than a value for correction of a crack portion of the branch point (crack) 840), an error of the branch point (crack) 840 is corrected. Then, the same line extraction as shown in the example of FIG. 8D is performed and thus the same line as shown in an example of FIG. 8E is extracted. As used herein, the term "straightness" refers to a distance of a straight line portion to be traced. If this distance is equal to or more than a predetermined value, the straightness goes straight and a crack portion is buried when it is present and a line in an extension direction of the straight line is selected if an intersection portion is present. Alternatively, the straightness may refer to a ratio of a distance of a straight line portion to a line to be traced. If this ratio is equal to or more than a predetermined value, the straightness goes straight and a crack portion is buried when it is present and a line in an extension direction of the straight line may be selected if an intersection portion is present.

Next, line elements will be described.

Figure 9:
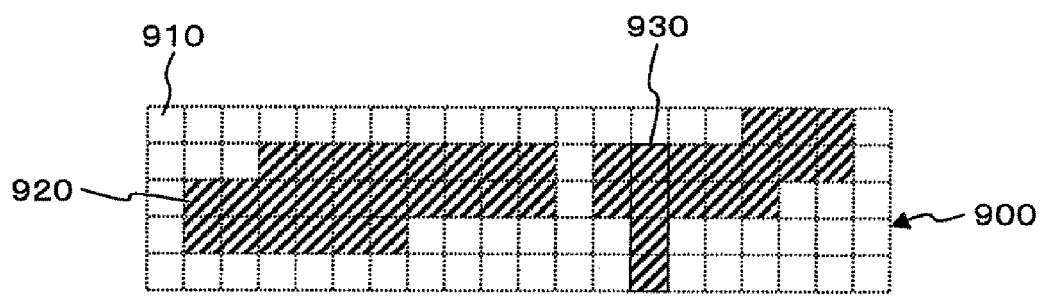
FIG. 9 is an explanatory view illustrating an example received image.

FIG. 9 is an explanatory view illustrating an example received image. A received image 900 is divided into background pixels 910 and pattern pixels 920 which are constituted by pixel runs 930 and the like. An example of extracting a horizontal line from this image 900 will be described below.

Figure 10:
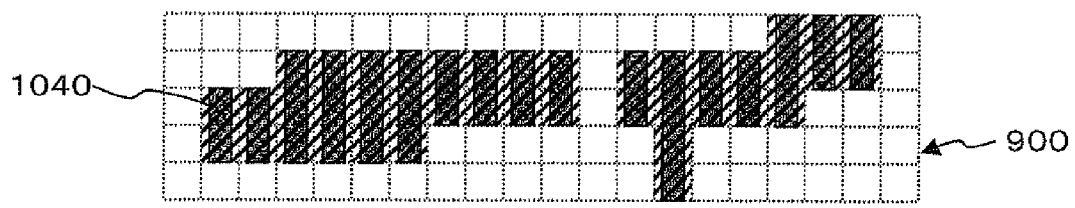
FIG. 10 is an explanatory view illustrating an example line element extracted from a received image.

FIG. 10 is an explanatory view illustrating an example line element extracted from the received image. The pattern pixels 920 are constituted by a set of line elements 1040 and the like. In this example, a line element refers to a region corresponding to a rectangular pixel lump which may constitute a line, or the above-described pixel runs. An example of "information indicating line element" may include information used to draw a line element, specifically, a line element drawing position, a line element size, and the like.

Figure 11:
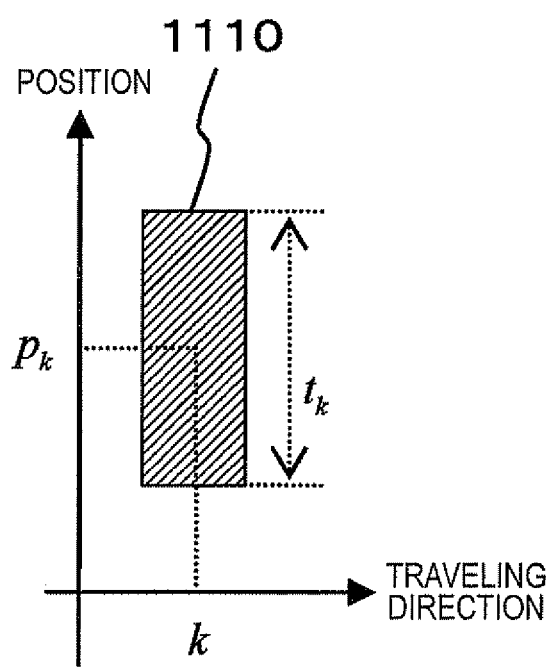
FIG. 11 is an explanatory view illustrating an example line element.

FIG. 11 is an explanatory view illustrating an example line element 1110. In this example, a line element refers to one region corresponding to a pixel run extending in a direction (a position direction in FIG. 11) intersecting a line direction (a traveling direction in FIG. 11).

Assuming that a line is constituted by a plurality of line elements, for example, a k-th line element has the following information:

$s_k$: line element size
$P_k$: line element position $s_k$ represents information on a line element shape and corresponds to a length in a direction intersecting (for example, perpendicular to) the line direction. That is, $s_k$ is information corresponding to a line thickness.

$P_k$ represents position information. For example, for a horizontal line, $P_k$ is information corresponding to a position in a y direction on an image. If necessary, this information may include a position in an x direction on the image.

As used herein, the term "tracing direction" refers to a horizontal (that is, x direction) line and may be either positive or negative. In this case, for the purpose of increasing memory efficiency, the tracing direction may be treated to be equal to a line element index (k). That is, if line element indexes are arranged in ascending order in the tracing direction, an advance of a line in ascending order of indexes corresponds to an advance of the line in the tracing direction, whereas an advance of a line in descending order of indexes corresponds to an advance of the line in the direction opposite to the tracing direction. On the other hand, if line element indexes are arranged in descending order in the tracing direction, an advance of a line in descending order of indexes corresponds to an advance of the line in the tracing direction, whereas an advance of a line in ascending order of indexes corresponds to an advance of the line in the direction opposite to the tracing direction.

As shown in the example of FIG. 11, a line element actually observed from an image has the minimum unit of one pixel. However, the minimum information unit of a line element may not necessarily be one pixel but may be a unit of less than one pixel. For example, a real line element may be obtained in the unit of less than one pixel based on an obtained line element. Alternatively, a line element may be generated from a state where there is no observed line element, such as line extraction including a correction process to supplement a line element in a halfway-cut portion. As shown in the example of FIG. 10, while a space between the $10^{th}$ line element from the left and the $11^{th}$ lime element from the left has a crack, it may be corrected to compensate it.

Figure 12:
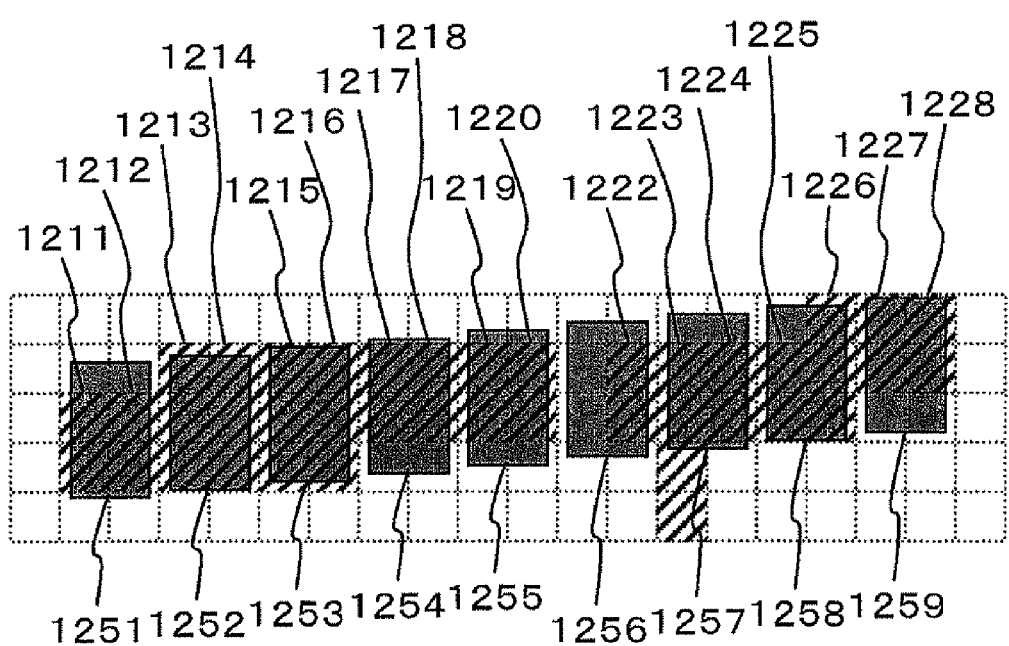
FIG. 12 is an explanatory view illustrating an example line element spanning over a plurality of pixels.

As shown in the example of FIG. 12, line element may span over a plurality of pixels. For example, the observation line element may be one pixel, and the correction line element may be a plurality of pixels. In this figure, observation line elements 1211 to 1228 indicated by hatched rectangles correspond to line elements observed within an image and correction line elements 1251 to 1268 indicated by gray rectangles correspond to line elements corrected based on the observation line element 1211 and the like. For example, a set of the observation line elements 1211 and 1212 extends upward to correspond to the correction line element 1251 (which means a set of the observation line elements 1211 and 1212 thickens the line width corresponding to this portion). In addition, while there is no line element observed between the observation line element 1220 and the observation line element 1222, the correction line element 1261 is generated.

The line extraction module 110 is connected to the reciprocating determination module 120 and the inversion processing module 130. The line extraction module 110 receives, as information on the image 106 which may possibly be a line, a set of information indicating a line element which is a rectangular pixel lump which may constitute a line, and extracts a line by performing tracing from a line start point to a line end point based on the information indicating the line element and a line tracing direction.

For example, the line extraction module 110 obtains line elements in a sequential manner with repetition of prediction and observation and combines the obtained line elements. First, the line extraction module 110 receives (line element, tracing direction) 108 which is a line element set including line elements corresponding to a start point and a tracing direction. The line element set is configured to determine which line element corresponds to the start point. For example, a line element index (k) of 0 may be assumed as a line element at the start point. Then, line tracing is performed by threading out line elements consecutive from the start point. If a line element observed and a predicted line element is matched, the matched line element is combined to the line (that is, the observed line element becomes a portion of the line). If not matched, the line is corrected and is traced up to an end point, when line information 112 is crossed, as an extracted line, to the reciprocating determination module 120. As used herein, the term "match" includes not only the complete equivalence of values of observed line elements and predicted line elements but also a difference between values which is less than a predetermined value.

Figure 13:
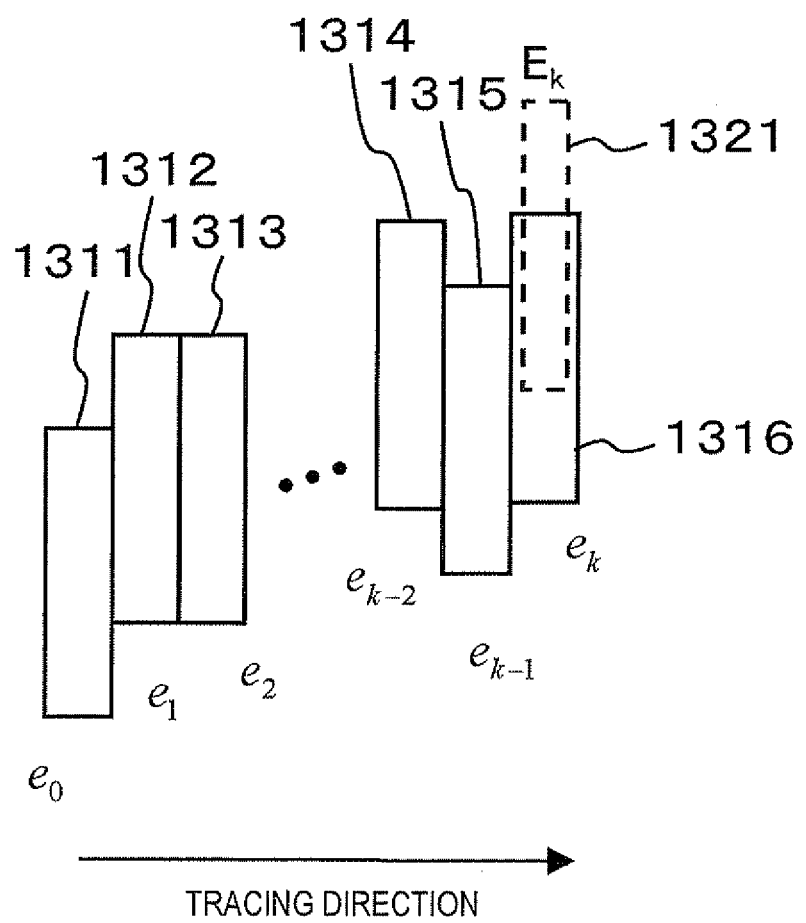
FIG. 13 is an explanatory view illustrating an example line element combination processing based on prediction and observation.

FIG. 13 is an explanatory view illustrating an example of a line element combination processing based on the prediction and observation performed by the line extraction module 110. Assume that a line element index is k and a k-th line element is $e_k$. A tracing direction is received with a line element $e_0$ at a start point and a set of line element $\{e_0, \ldots, e_{k-1}\}$.

Then, a prediction processing is performed. That is, a prediction value $E_k$ of $e_k$ is calculated. According to the prediction processing, the prediction value $E_k$ is calculated based on the set of line element $\{e_0, \ldots, e_{k-1}\}$ (or possibly a portion thereof) and the tracing direction. In addition, the line elements may retain information on the tracing direction. For example, a calculation such as $P_k = p_{k-1} + \sigma p_{k-1}$ may be performed, and variation $\sigma p_{k-1}$ of subsequent line elements may be used. For example, as the variation $\sigma p_{k-1}$, $s_k$ may be $\pm \alpha$, $p_k$ may be is equal to or less than $+\beta$, and so on.

Next, an observation process is performed. That is, $e_k$ is extracted. According to the observation process, $e_k$ is extracted from the image 106 based on the prediction value $E_k$. That is, when $e_k$ which has a sufficiently small difference with the prediction value $E_k$ is observed, $e_k$ is combined. As used herein, the term "difference" indicates that a difference of the value between $s_k$ and $p_k$ of the observation value $e_k$ and prediction value $E_k$ is less than a predetermined value. The line extraction is repeated up to the end point (a line element when no line element is present in a predetermined range of observation values). Alternatively, the method described in A. Lemaitre, J. Camillerapp, "Text Line Extraction in Handwritten Document with Kalman Filter Applied on Low Resolution Image," Proceedings of the Second International Conference on Document Image Analysis for Libraries (DIAL'06), 2006 may be employed for the line extraction processing.

In addition, (line element, tracing direction) 108 received by the line extraction module 110 includes at least start line elements and a predetermined tracing direction at a start point extracted by a start point retrieval processing for the first extracting processing and includes (line element, tracing direction) 108 received from the inversion processing module 130 for the second and subsequent extraction processing (reciprocating processing).

The reciprocating determination module 120 is connected to the line extraction module 110 and the inversion processing module 130. The reciprocating determination module 120 receives the line information 112 from the line extraction module 110 and determines whether or not to cause the inversion processing module 130 to perform a process. If a predetermined condition is satisfied (that is, if the inversion processing module 130 is not caused to perform a process), line information 124 is output as an extracted line. The output of the line information 124 includes storage of the information in a storage medium such as, for example, a hard disk or the like, cross of the information to other image processing apparatus, and so on. For example, the other image processing apparatus may determine whether or not a line indicated by the line information 124 is employed as a final line, or may perform a process such as generating an image only having lines using the line information 124, or may perform a process, which will be described later, using the examples of FIGS. 19 and 20.

In addition, the reciprocating determination module 120 may count the number of times that a process is performed by the line extraction module 110 or the inversion processing module 130 and compare the counted number of times with a predetermined number of times to determine whether or not to cause the inversion processing module 130 to perform a process.

In addition, the reciprocating determination module 120 may compare a start point or end point of a line extracted by a previous process of the line extraction module 110 with an end point or start point of a line determined by the current process of the reciprocating determination module 120 to determine whether or not to cause the inversion processing module 130 to perform a process. Combinations of objects to be compared include a combination of a start point of a line by the previous process and an end point of a line by the current process and a combination of an end point of a line by the previous process and a start point of a line by the current process. The determination may be made through either comparison of one combination or comparison of both combinations. In particular, adoption of comparison of the start point of the line by the previous process with the end point of the line by the current process eliminates wasteful comparison. Of course, the start point and the end point by the previous process are memorized for this determination process.

In addition, the reciprocating determination module 120 may determinate whether or not to cause the inversion processing module 130 to perform a process based on feature amounts of a line extracted by the line extraction module 110.

In addition, two or more combinations of these determination processes may be used.

Hereinafter, the process of the reciprocating determination module 120 will be described in more detail.

The reciprocating determination module 120 determines whether or not to cause the inversion processing module 130 to perform an inversion process depending on whether or not the line information 112 satisfies a predetermined condition.

This determination process refers to the number of times of reciprocation turn. The number of times of reciprocation turn is the number of times of reciprocation made in the past for a line being extracted. More specifically, it is the number of times that processes are performed by the line extraction module 110 or the inversion processing module 130. If it does not reach a predetermined value, an inversion process is performed. This allows the number of times of reciprocation turn to be maintained as a variable.

Figure 14A:
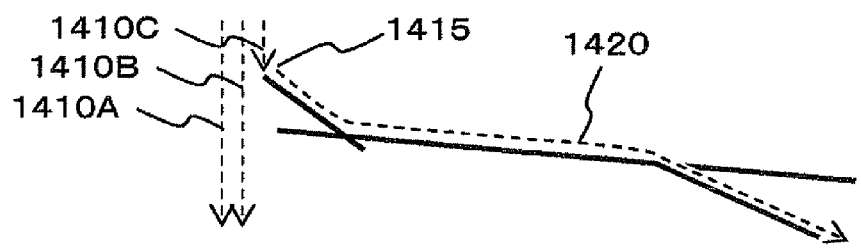
FIGS. 14A, 14B, 14C and 14D are explanatory views illustrating an example reciprocating processing.
Figure 14B:
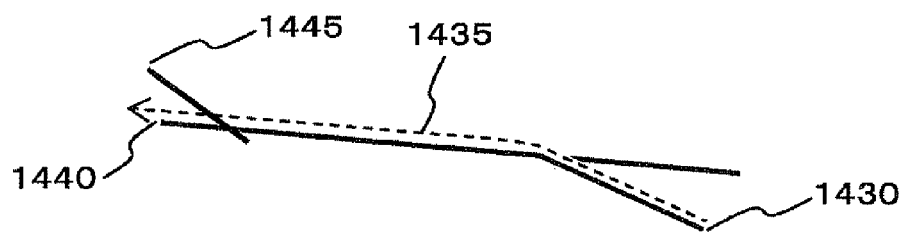
Figure 14C:
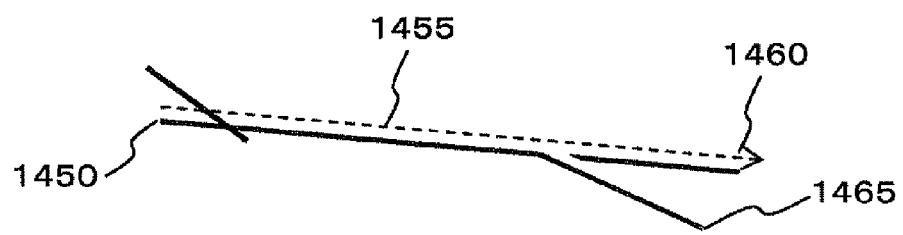
Figure 14D:
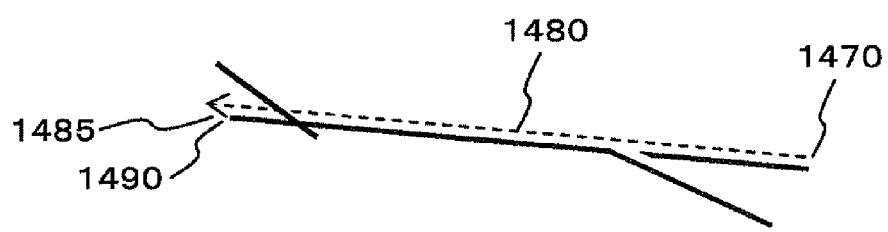
Figure 17A:
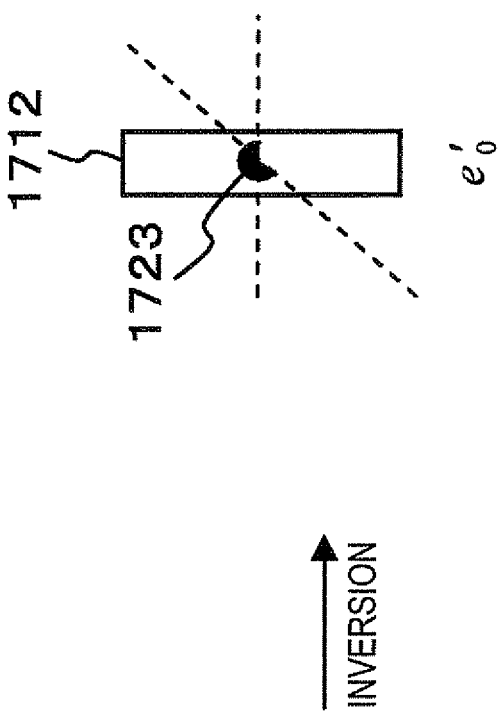
Figure 17B:
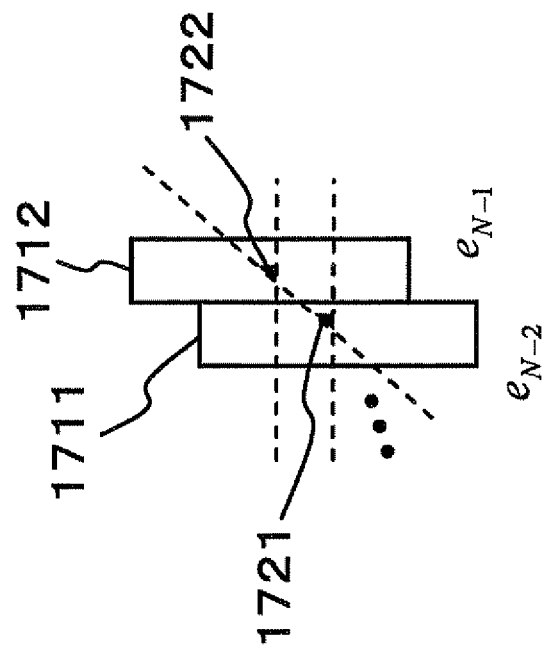

In addition, a relationship with a line extracted immediately before may be referred to. The line extracted immediately before indicates a line being currently extracted with start line elements provided thereto. Therefore, since there is no line extracted immediately before line at the number of times of reciprocation turn=0, this is not referred to. More specifically, if a distance between a position $P0^{Pre}$ of a line element at a start point of the line extracted immediately before line and a position $p_{N-1}$ of a line element at an end point of the line being currently extracted is equal to or more than a predetermined value, an inversion process is performed. An outline of this reciprocating determination based on matching of end points is shown in an example of FIGS. 14A, 14B, 14C and 14D. As shown in an example of FIG. 14A, line tracing is performed in a line extraction direction 1420 from a start line element $P_0$ 1415 extracted by start point retrieval scanning 1410A, 1410B, and 1410C. In addition, the number of times of reciprocation is 0 at this times as shown in an example of FIG. 14B, with a start line element $P_0$ 1430, which is an end point in the line extraction direction 1420, set to a start point, line tracing is performed in a line extraction direction 1435, threading out up to an end line element $P_{N1-1}$ 1440. Here, since a distance between the previous start line element $P_0$ 1415 and the current end line element $P_{N1-1}$ 1440 is equal to or more than a predetermined value, an inversion process is performed. At this time, the number of times of reciprocation is 1. Next, as shown in an example of FIG. 14C, with the end line element $P_{N1-1}$ 1440 in the example of FIG. 14B set to a start line element $P_0$ 1450, line tracing is performed for a previous start line element $P_0^{pre}$ 1445, threading out up to an end line element $P_{N2-1}$ 1460. Here, since a distance between the previous start line element $P_0$ 1430 and the current end line element $P_0^{pre}$ 1465 is equal to or more than a predetermined value, an inversion process is performed. At this time, the number of times of reciprocation is 2. Next, as shown in an example of FIG. 14D, with the end line element $P_{N2-1}$ 1460 in the example of FIG. 14C set to a start line element $P_0$ 1470, line tracing is performed in a line extraction direction 1480, threading out up to an end line element $P_{N3-1}$ 1485. At this time, the number of times of reciprocation is 3. Here, since a distance between the previous start line element $P_0$ 1450 (the previous start line element $P_0^{pre}$ 1490) and the current end line element $P_{N3-1}$ 1485 is less than a predetermined value, no inversion process is performed and a line from the start line element $P_0$ 1470 to the end line element $P_{N3-1}$ 1485 is output as the line information 124. In this manner, by detecting a one-to-one correspondence between start points and end points, line extraction may be performed without depending on a threshold $\theta_{turn}$ of the number of times of reciprocation. This process maintains $p_0^{pre}$. Here, $N_n$ represents the number of line elements obtained by the line extraction by n reciprocations.

In addition, feature amounts of a line may be referred to. Examples of the feature amounts of the line include length, thickness, slope, and so on of the line. If these feature amounts of the line do not satisfy a predetermined condition, a line is output without performing a reciprocating processing. If a line that is improper from a standpoint of the feature amounts is extracted (that is, if a line does not satisfy predetermined feature amounts), the reciprocating processing may be stopped to avoid incorrect line extraction. The feature amounts of the line may be calculated by the line extraction module 110 or the reciprocating determination module 120.

The inversion processing module 130 is connected to the reciprocating determination module 120 and the line extraction module 110. The inversion processing module 130 sets an end point of a line extracted by the line extraction module 110 as a start point, inverts a line tracing direction used when the previous line extraction module 110 extracts the line, and crosses the start point and the inverted line tracing direction to the line extraction module 110. It is to be understood that the line tracing direction crossed by the inversion processing module 130 is a direction obtained by inverting a line direction used when the previous line extraction module 110 extracts the line. That is, when the next line extraction module 110 extracts a line, line tracing is performed in a direction opposite to the tracing direction when the line is previously extracted, making a reciprocating for the line. Here, the reciprocating refers to line tracing in the direction of the start point at the previous time. However, this does not result in the previous start point necessarily becoming an end point, as described above.

Hereinafter, the process of the inversion processing module 130 will be described in more detail.

The inversion processing module 130 outputs a line element, which corresponds to an end point of a line extracted by the process of the current line extraction module 110, to the line extraction module 110, as a line element for start of a process of the next line extraction module 110. In addition, a tracing direction is inverted and is output to the line extraction module 110, as a tracing direction of line extraction in the next line extraction module 110.

A line having N line elements is set as a set $\{e_0, \ldots, e_{N-1}\}$. Assume that this line is subjected to an inversion process.

The inversion process outputs a line element $e'_0$ for start of the next line extraction based on a line element $e_{N-1}$ corresponding to a line end point.

Details for this are shown in FIGS. 15A and 15B. As shown in an example of FIGS. 15A and 15B, line elements 1511, 1512, 1513, 1514, and 1515 ($e_{N-1}$) are traced (tracing direction: d) from the left to the right and are subjected to an inversion process, which results in inversion of a positive and negative of the value d indicating the tracing direction with the line element 1515 as a start point ($e'_0$).

For output of line elements for starting, if there is a variation in information having a line element to subsequent line elements, this value is also inverted. This variation corresponds to a tracing direction. The example of FIGS. 15A and 15B shows the entire tracing direction with a tracing direction for the next line element added to individual line elements.

More specifically, if the variation is a differential value, the value of the positive and negative may be inverted. If the variation is an angle, π [rad] may be added or subtracted. These detailed examples are shown in FIGS. 16A, 16B, 17A and 17B. In the example of FIGS. 16A and 16B, a variation $\delta P_{N-2}$ 1621, a variation $\delta P_{N-1}$ 1622 and a variation $\delta P'_0$ 1623 indicate variations in subsequent line elements. Setting $-\delta P_{N-1}$, which is an inversion of the positive and negative of the variation $\delta P_{N-1}$ 1622, to the variation $\delta P'_0$ 1623 corresponds to an inversion of tracing direction. In addition, in the example of FIGS. 17A and 17B, an angle $\omega_{N-2}$ 1721, an angle $\omega_{N-1}$ 1722, and an angle $\omega'_0$ 1723 indicate angles in subsequent line elements. Setting $(\omega_{N-1}+\pi)$ which is an addition of π [rad] to the angle $\omega_{N-1}$ 1722 to the angle $\omega'_0$ 1723 corresponds to an inversion of tracing direction.

In addition, when inverted, for the purpose of line extraction more adaptive for a target line, parameters referred to in the line extraction of the line extraction module 110 may be updated.

Figure 18:
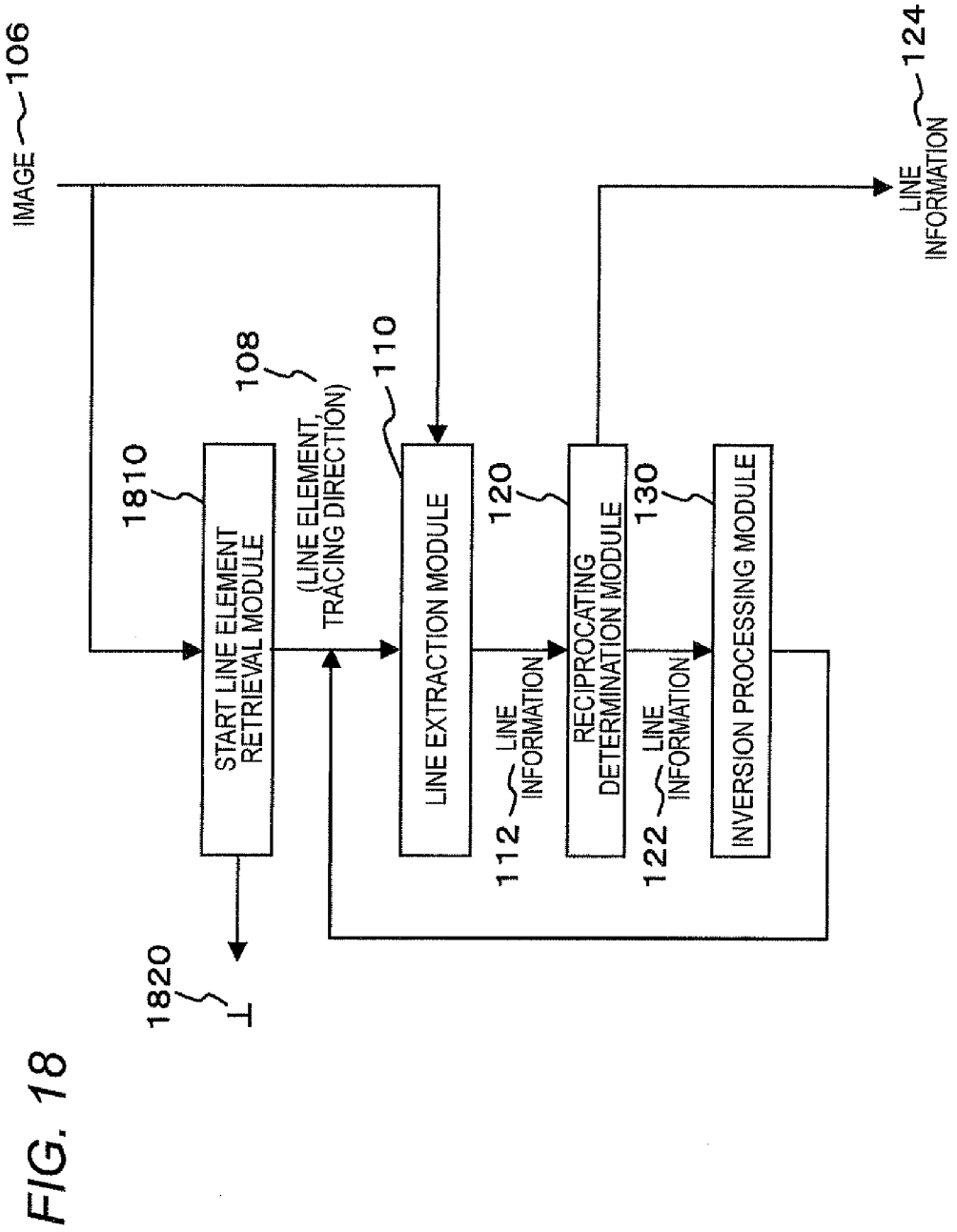
FIG. 18 is a conceptual module configuration view of an example configuration according to a second embodiment.

FIG. 18 is a conceptual module configuration view of an configuration example according to a second embodiment. An image processing apparatus according to the second embodiment includes a start line element retrieval processing and extracts a line pattern (image) from a target image. As shown in the example of FIG. 18, the image processing apparatus includes a start line element retrieval module 1810, a line extraction module 110, a reciprocating determination module 120, and an inversion processing module 130. The same elements as those in the first embodiment are denoted by the same reference numerals and explanation thereof will not be repeated.

The start line element retrieval module 1810 is connected to the line extraction module 110. The start line element retrieval module 1810 outputs (line element, tracing direction value) 108 to the line extraction module 110 based on an image 106. If any line element for start is not extracted, invalid information 1820 is output as an invalid signal and the process is ended. As shown in the example of FIG. 7A, scanning may be performed with a wide interval (specifically, a scanning interval is predetermined.), or for each of consecutive pixels.

The start line element retrieval module 1810 may extract end points by performing a thinning line process, an edge extraction process, or the like, and may extract line elements using these end points.

In addition, the line extraction module 110 is connected to the start line element retrieval module 1810, the reciprocating determination module 120, and the inversion processing module 130. The line extraction module 110 uses (line element, tracing direction) 108 received from the start line element retrieval module 1810 for the first line tracing processing and (line element, tracing direction) 108 received from the inversion processing module 130 for the second and subsequent line tracing processing.

Figure 19:
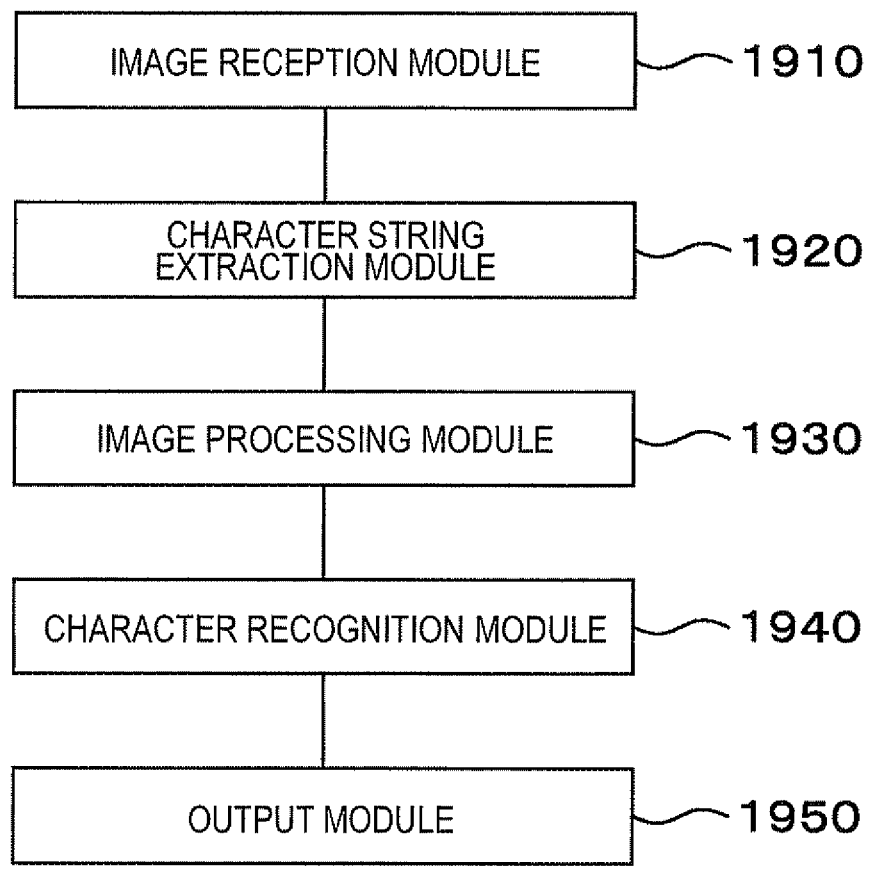
FIG. 19 is a conceptual module configuration view of an example configuration according to a third embodiment.

FIG. 19 is a conceptual module configuration view of an example configuration according to a third embodiment.

The configuration of the fourth embodiment includes an image reception module 1910, a character string extraction module 1920, an image processing module 1930, a character recognition module 1940 and an output module 1950.

The image reception module 1910 is connected to the character string extraction module 1920. The image reception module 1910 receives an image including a character string. The image may also include an underline, a cancellation line and so on.

The character string extraction module 1920 is connected to the image reception module 1910 and the image processing module 1930. The character string extraction module 1920 extracts a character string from the image received by the image reception module 1910 and extracts an image having a possibility of being line, based on a direction of the character string. The character string extraction may use existing techniques. For example, histograms of black pixels in vertical and horizontal directions may be taken and directions of vertical-writing and horizontal-writing may be extracted from a distribution of the histograms. An image which is likely to be a line is extracted with the direction of the character string as a line direction.

The image processing module 1930 is connected to the character string extraction module 1920 and the character recognition module 1940 and corresponds to one of the image processing apparatus of the first embodiment and the image processing apparatus of the second embodiment. That is, it extracts a line by using a direction of character strings in the image received by the character string extraction module 1920, as a tracing direction of the line.

The character recognition module 1940 is connected to the image processing module 1930 and the output module 1950. The character recognition module 1940 erases an image determined as a line from the image by the image processing module 1930 and recognizes only a character image.

The output module 1950 is connected to the character recognition module 1940 and outputs a result of character recognition by the character recognition module 1940.

Figure 20:
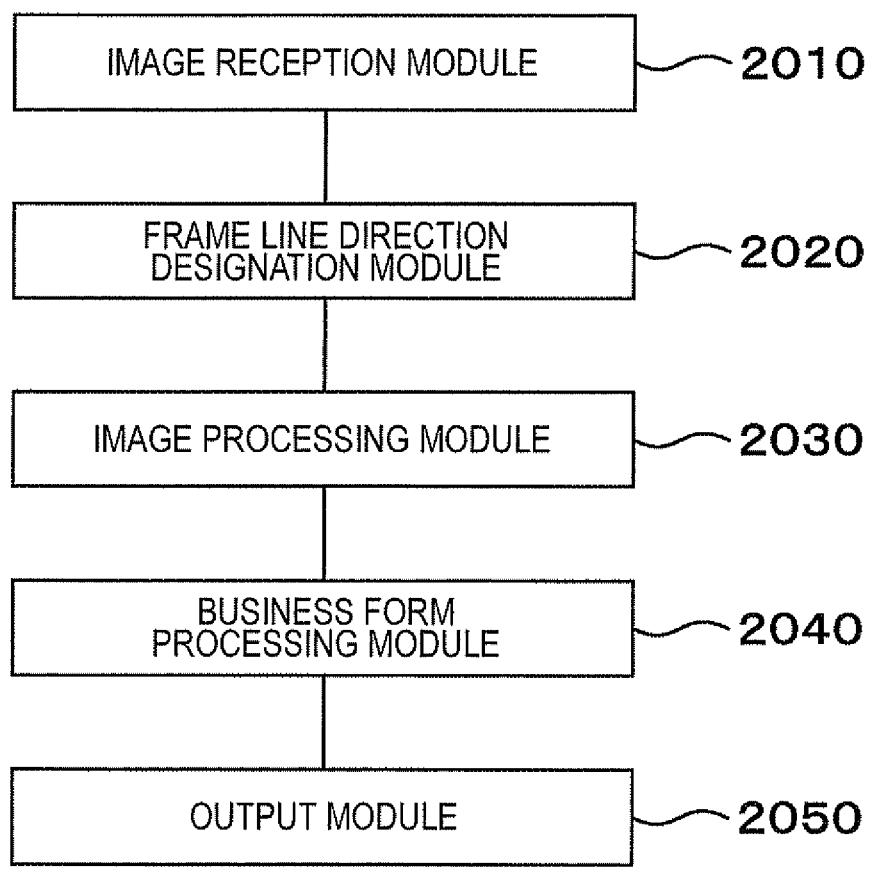
FIG. 20 is a conceptual module configuration view of an example configuration according to a fourth embodiment.

FIG. 20 is a conceptual module configuration view of an example configuration according to a fourth embodiment.

The configuration of the fifth embodiment includes an image reception module 2010, a frame line direction designation module 2020, an image processing module 2030, a business form processing module 2040 and an output module 2050.

The image reception module 2010 is connected to the frame line direction designation module 2020 and receives an image including a frame line, such as, for example, a business form image.

The frame line direction designation module 2020 is connected to the image reception module 2010 and the image processing module 2030. The frame line direction designation module 2020 extracts a frame line direction from an image received by the image reception module 2010 and crosses the frame line direction and the image to the image processing module 2030. For example, vertical and horizontal lines which are mainly used in business forms may each be tested. More specifically, a frame line direction may be extracted depending on whichever there is more of vertical lines or horizontal lines. In addition, if the number of pixels in both of the vertical and horizontal directions is equal to or more than a predetermined value, both of the vertical and horizontal directions may be extracted as frame line directions.

The image processing module 2030 is connected to the frame line direction designation module 2020 and the business form processing module 2040 and corresponds to one of the image processing apparatus of the first embodiment and the image processing apparatus of the second embodiment. That is, it extracts a line by using a direction of the frame line extracted by the frame line direction designation module 2020, as a tracing direction of the line.

The business form processing module 2040 is connected to the image processing module 2030 and the output module 2050. The business form processing module 2040 determines columns in the business form from positions of line images determined as lines from the image by the image processing module 2030, and recognizes character image in the columns, thereby associating the determined columns with a character recognition result.

The output module 2050 is connected to the business form processing module 2040 and outputs a result of business form process by the business form processing module 2040.

Figure 21:
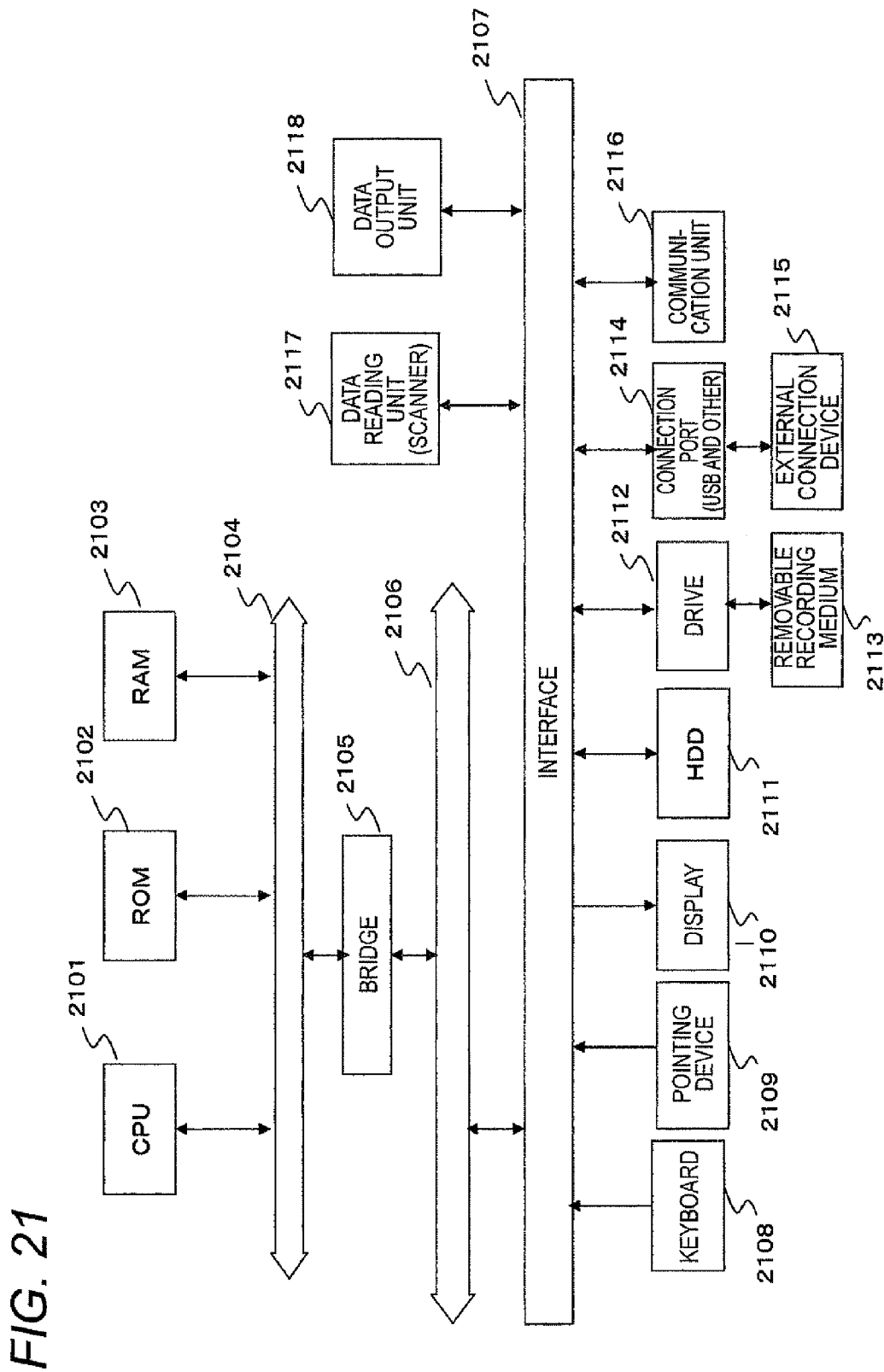
FIG. 21 is a block diagram illustrating an example hardware configuration of a computer implementing this embodiment.

Now, an example of hardware configuration of the image processing apparatus of this embodiment will be described with reference to FIG. 21. The hardware configuration shown in FIG. 21 is configured by, for example, a personal computer (PC) or the like, including a data reading unit 2117 such as a scanner or the like, a data output unit 2118 such as a printer or the like.

A CPU 2101 is a control unit for executing a process according to a computer program describing an execution sequence of various modules described in the above embodiment, such as the line extraction module 110, the reciprocating determination module 120, the inversion processing module 130, the start line element retrieval module 1810, a character string extraction module 1920, the image processing module 1930, the character recognition module 1940, the frame line direction designation module 2020, the image processing module 2030, The business form processing module 2040 and so on.

A read only memory (ROM) 2102 stores programs, operation parameters and so on used by the CPU 2101. A random access memory (RAM) 2103 stores programs used for execution by the CPU 2101, parameters properly changed for the execution, etc. These memories are interconnected via a host bus 2104 such as a CPU bus or the like.

The host bus 2104 is connected to an external bus 2106 such as a peripheral component interconnect/interface (PC) bus or the like via a bridge 2105.

A point device 2109 such as a keyboard 2108, a mouse or the like is an input device manipulated by an operator. A display 2110, such as a liquid crystal display apparatus, a cathode ray tube (CRT) or the like, displays various kinds of information as text or image information.

A hard disk drive (HDD) 2111 contains a hard disk and drives the hard disk to record or reproduce programs or information executed by the CPU 2101. The hard disk stores received images, information of line element, etc. In addition, the hard disk stores various kinds of computer programs such as data processing programs.

A drive 2112 reads data or programs recorded in a removable recording medium 2113 mounted thereon, such as a magnetic disk, an optical disk, a magneto-optical disk, a semiconductor memory or the like, and supplies the read data or programs to the RAM 2103 via an interface 2107, the external bus 2106, the bridge 2105 and the host bus 2104. The removable recording medium 2113 may also be used as a data recording region like the hard disk.

A connection port 2114 is a port which is connected to an external connection device 2115 and includes a connection unit such as a USB, IEEE1394 or the like. The connection port 1614 is also connected to the CPU 2101 and so on via the interface 2107, the external bus 2106, the bridge 2105, the host bus 2104 and so on. A communication unit 2116 is connected to a network for conducting data communication with the external. The data reading unit 2117 is, for example, a scanner for reading a document. The data output unit 2118 is, for example, a printer for outputting document data.

The hardware configuration of the image processing apparatus shown in FIG. 21 is a example of the configuration, and this embodiment is not limited to the hardware configuration shown in FIG. 21 but may have any configuration as long as it can execute the modules described in this embodiment. For example, some modules may be configured as a dedicated hardware (for example, ASIC (Application Specific Integrated Circuit) or the like), some modules may be in an external system and connected via a communication link, and additionally a plurality of the system shown in FIG. 21 may be interconnected via a communication link to cooperate between them. In addition, the hardware configuration may be assembled in a copier, facsimile, scanner, printer, a multifunction copier (image processing apparatus having two or more of functions of scanner, printer, copier and facsimile and the like), etc.

The above-described various embodiments may be combined (for example, including adding modules in one embodiment to another embodiment or substituting them with those in another embodiment), or the techniques described in the [Background Art] may be employed as contents of processing of various modules.

The above-described program may be stored in a recording medium or may be provided by communication means. In this case, for example, the above-described program may be understood as the invention of "computer-readable recording medium having a program recorded thereon."

"Computer-readable recording medium having a program recorded thereon" refers to a computer-readable recording medium having a program recorded thereon, which is used for installation, execution, distribution and so on of the program.

The recording medium may include, for example, a digital versatile disc (DVD) such as "DVR-R, DVD-RW, DVD-RAM and the like", which are a standard specified by DVD Forum, and "DVD+R, DVD+RW and the like", which are a standard specified as DVD+RW, a compact disc (CD) such as read-only memory (CD-ROM), CD recordable (CD-R), CD rewritable (CD-RW) or the like, a blue-ray disc(trade mark), a magneto-optical disc (MO), a flexible disc (FD), a magnetic tape, a hard disk, a read only memory (ROM), an electrically erasable programmable read-only memory (EEPROM(trade mark)), a flash memory, a random access memory (RAM), or the like.

The program or a part thereof may be recorded in the recording medium for storage and distribution. In addition, the program or a part thereof may be transmitted via communication means, for example, a transmission medium such as a wired network or a wireless network used for a local area network (LAN), metropolitan area network (MAN), wide area network (WAN), Internet, intranet, extranet and so on, or further a combination thereof, or may be carried using a carrier wave.

The program may be a part of other program or may be recorded in the recording medium along with a separate program. In addition, the program may be divided and recorded in a plurality of recording media. In addition, the program may be recorded in any form including compression, encryption and so on as long as it can be reproduced.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a line information reception unit that receives a set of information indicating (i) information on an image having a possibly of being a line and (ii) line elements being a rectangular pixel lump which constitutes a line;
    a line extraction unit that extracts a line by tracing from a first start point to an end point of the line, based on the information indicating the line elements received by the line information reception unit and a tracing direction of the line;
    an inversion unit that inverts the tracing direction of the line, that sets the end point of the line extracted by the line extraction unit as a second start point and that sends the second start point and the inverted tracing direction to the line extraction unit; and a determination unit that determines whether or not to cause the inversion unit to perform a process.

2. The image processing apparatus according to claim 1, wherein the determination unit counts the number of process times of the line extraction unit or the inversion unit, and the determination unit determines whether or not to cause the inversion unit to perform the process by comparing the counted number of times with a predetermined number of times.

3. The image processing apparatus according to claim 1, wherein the determination unit determines whether or not to cause the inversion unit to perform the process by comparing the first start point or a first end point of the line in a previous process of the line extraction unit with an second end point or the second start point of a line in a current process of the line extraction unit.

4. The image processing apparatus according to claim 1, wherein the determination unit determines whether or not to cause the inversion unit to perform the process based on feature amounts of the line extracted by the line extraction unit.

5. The image processing apparatus according to claim 1, wherein the line extraction unit extracts the line with a character string direction as a line tracing direction from an image including a character string.

6. The image processing apparatus according to claim 1, wherein the line extraction unit extracts the line with a frame line direction as a line tracing direction from an image including a frame line.

7. An image processing method comprising:

receiving a set of information indicating (i) information on an image having a possibly of being a line and (ii) line elements being a rectangular pixel lump which constitutes a line;

extracting a line by tracing from a first start point to an end point of the line, based on the received information indicating the line elements and a tracing direction of the line;

inverting the tracing direction of the line;

setting the end point of the line extracted by the line extraction unit as a second start point;

sending the second start point and the inverted tracing direction to the line extraction step; and determining whether or not to cause the inversion step to perform a process.

8. A non-transitory computer-readable medium storing a program that causes a computer to execute image processing, the image processing comprising:

receiving a set of information indicating (i) information on an image having a possibly of being a line and (ii) line elements being a rectangular pixel lump which constitutes a line;

extracting a line by tracing from a first start point to an end point of the line, based on the received information indicating the line elements and a tracing direction of the line;

inverting the tracing direction of the line;

setting the end point of the line extracted by the line extraction as a second start point;

sending the second start point and the inverted tracing direction to the line extraction step; and determining whether or not to cause the inversion step to perform a process.

* * * * *